April 29, 1952　　　A. M. MacCALLUM　　　2,594,326
TRIM TAB SERVOMOTOR CONTROL
Filed Dec. 31, 1947
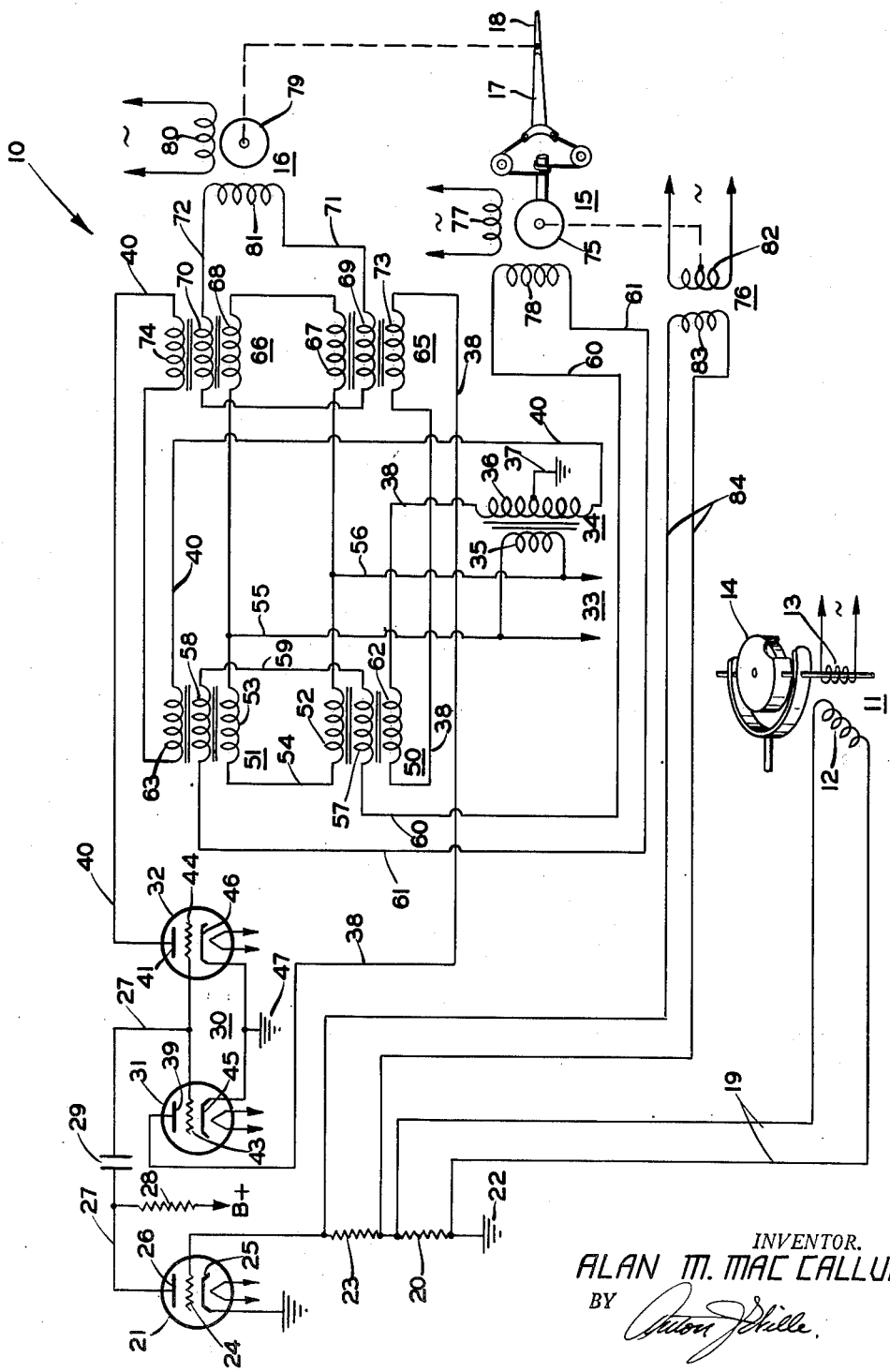
INVENTOR.
ALAN M. MAC CALLUM
BY
-ATTORNEY- Patented Apr. 29, 1952

2,594,326

UNITED STATES PATENT OFFICE 2,594,326

TRIM TAB SERVOMOTOR CONTROL

Alan M. MacCallum, Maywood, N. J., assignor to Bendix Aviation Corporation, Teterboro, N. J., a corporation of Delaware Application December 31, 1947, Serial No. 794,882

9 Claims. (Cl. 244—77).

1

This invention relates to the control of aircraft in level flight, and more particularly to an automatic pilot system for aircraft by which the trim tabs of the craft are positioned to maintain the desired flight attitude.

Changes in the loading of an aircraft in flight due in most instances to the consumption of fuel supply, or the walking about of passengers within the cabin will result in a change in the flight attitude of the craft causing the craft to gain or lose altitude. In flights controlled by automatic pilot systems the flight attitude is normally corrected by the error signals developed by the artificial horizon gyroscope and used to deflect the elevators to compensate for the tail heavy or nose heavy condition of the craft. Trim tab controls are also provided whereby the aircraft is trimmed by the deflection of the tab surfaces. Both methods as presently used for trimming the craft are far from desirable in view of the constant observation of the flight instruments required of the pilot to position the trim tabs for maintaining a level flight attitude. In the case of the deflection of the elevator by the pilot system to trim the craft, the angle of attack of the surface required to trim the craft, will increase the drag thereon reducing the air speed.

An object of my present invention is therefore, to provide an automatic pilot system with means for trimming the craft in flight by positioning the trim tab surfaces in response to the error signals developed by the artificial horizon gyroscope.

Another object of my invention is to provide in an automatic pilot system a trim tab servo control which is operable upon all error signals and in which the servomotor has a high gear ratio.

A further object of my invention is to provide in an automatic pilot system for aircraft a balanced inductive circuit adapted to be unbalanced upon craft deviation from a level flight attitude to operate the trim tab servomotor to deflect the tab surfaces for restoring the level flight attitude.

Still another object of my invention is to provide in an automatic pilot system a trim tab servo control which shall be automatic and positive in its action, relatively inexpensive to manufacture, which shall have a large variety of applications, and yet be practical and efficient to a high degree in use.

Other objects of this invention will in part be obvious, and in part hereinafter pointed out.

In the accompanying drawing forming a part of this specification and in which the single figure is a schematic wiring diagram of one of the various illustrative embodiments of my invention,

2 the numeral 10 designates an elevator control circuit of an automatic pilot system as disclosed in a copending application for Automatic Pilot bearing Serial No. 516,488 and filed on December 31, 1943 by me among others. The circuit 10 comprises a source of pitch signal 11, herein illustrated as a take-off device having a stator winding 12 and a rotor winding 13 connected across a suitable source of alternating current supply, movable with respect to the stator winding 12 by the precession of an artificial horizon gyro 14 about its pitch axis; and two servomotors 15 and 16 to operate the elevator surface 17 and trim tab surface 18, respectively, of an aircraft in response to the pitch signal voltages of the take-off 11.

The stator winding 12 of the take-off device is connected by leads 19 across a resistor 20 forming a part of the input circuit of a triode tube 21. The resistor 20 is grounded at one end, as at 22, and connected at the other end through a resistor 23 to the grid 24 of the tube 21. The indirectly heated cathode 25 of the tube is grounded, while the anode 26 is connected by lead 27 through a resistor 28 to B+ supply, and through a coupling condenser 29 to the input of a phase discriminating circuit 30.

A change in the attitude of the aircraft from normal level flight due to the movements of the passengers within the cabin, or to a change in loading as the engine fuel is consumed, or to other causes, will result in a precession of the vertical gyro 14 about its pitch axis, causing a relative movement of the rotor winding 13 with respect to the stator winding 12 of the take-off device 11. A signal voltage will thus be induced in the stator winding, the phase and amplitude of which is responsive to the direction and extent of the change in attitude of the aircraft. This signal voltage is applied across the resistor 20 and appears on the grid 24 of the triode 21. The tube 21 will amplify this signal voltage and impress the same as undulating direct current on the discriminator circuit 30.

The phase discriminator circuit 30 comprises two triode tubes 31 and 32 connected in push-pull arrangement to the plate circuit lead 27 and to a suitable source of A. C. supply 33 by way of a transformer 34. The transformer comprises a primary winding 35 and a secondary winding 36 which is center-tapped and grounded as at 37. One end of the secondary winding is connected by lead 38 to the plate 39 of the tube 31, while the other end of the winding is connected by a lead 40 to the plate 41 of the tube 32. The grids 43 and 44 of the tubes 31 and 32, respectively, are connected to the plate circuit lead 27, while the respective cathodes 45 and 46 are grounded as at 47. The tubes 31 and 32 are biased to cut-off.

The voltages applied to the plates 39 and 41 of the two triodes are 180° out of phase. It will be apparent that the tube which operates upon the impression of a signal voltage on the grid thereof is dependent upon the phase of the impressed signal voltage. Thus, in the case of a change in aircraft attitude in which the craft noses down, we may assume that tube 31 will be operated, while tube 32 operates when the craft is tail heavy.

Connected into the plate circuit lead 38 of tube 31 is a saturable transformer 50, while a similar transformer 51 is connected into the lead 40 of the tube 32. Each of the saturable transformers comprises a soft iron core (not shown) heavy primary windings 52 and 53 connected in series by a lead 54 and by leads 55, 56 across the voltage source 33, and secondary windings 57 and 58 connected in series opposed relation by a lead 59, the ends of the secondary windings being connected respectively to the output leads 60 and 61. Saturating windings 62 and 63 are also provided, being connected into the plate circuit leads 38 and 40, respectively.

When the aircraft is in level flight, no displacement signals will be induced in the stator winding 12 of the take-off device 11. The signal voltages impressed upon the grids 43 and 44 of the discriminator triodes are thus zero, and no plate current due to signal voltages will flow. The network described will be balanced, the voltage induced in the secondary winding 57 being equal to, and opposite in phase to the voltage induced in the secondary winding 58. With the induced voltages equal and opposite, no current will flow in the output leads 60 and 61.

When a change in aircraft attitude occurs, a voltage will be induced in the stator winding 12 of the take-off device 11 due to the precession of the gyro vertical about its pitch axis. This voltage is amplified by the triode 21 and impressed on the grids 43 and 44 of the discriminator 30. Depending upon the phase of the induced displacement signal, tube 31 or 32 will operate. If we assume a nose-heavy condition of the aircraft, the tube 31 will be operated to provide an undulating direct current through the saturating winding 62 of the transformer 50. The current in the winding 62 will saturate the core of the transformer. The alternating current induced in the secondary winding 57 is reduced by the saturated core, so that the balance with the voltage in winding 58 destroyed, permitting a current to flow in the output leads 60 and 61. When tube 32 operates due to a tail-heavy attitude of the aircraft, the output of tube 32 will saturate the core of transformer 51 due to the current in the saturating winding 63. A current will again flow in the output leads 60, 61, this time opposite in phase to that flowing during the nose-heavy attitude of the aircraft.

Connected into the plate circuit leads 38 and 40 and in series with the transformer 50 and 51, are two similar saturable transformers 65 and 66, respectively. The saturable transformers 65 and 66 form a balanced voltage device similar to that described; primary windings 67 and 68 being connected in series across the potential source 33, secondary windings 69 and 70 being connected in series opposed relation and providing output leads 71 and 72, and saturating windings 73 and 74 being series connected into the leads 38 and 40 with the windings 62 and 63, respectively.

The elevator servomotor 15 is a two phase induction motor having an armature 75 suitably coupled to the elevator 17 and adapted to drive a follow-up signal generator 76, more fully described below. The motor 15 is provided with a fixed phase 77 connected across a suitable source of alternating potential, and a variable phase 78 connected to the leads 60, 61 of the reactors 50, 51. The trim tab servomotor 16 is similar to motor 15 and is provided with an armature 79 coupled to the secondary surface 18 through a high gear ratio, a fixed phase 80 connected across a suitable voltage supply, and a variable phase 81 connected across the leads 71, 72 of the saturable transformers 65, 66.

A deviation from level flight attitude by the aircraft will unbalance the transformers 50, 51 and 65, 66 in the manner described to provide power to the servomotors 15 and 16 through the respective leads 60, 61 and 71, 72. The operation of the motors 15 and 16 will deflect their respective control surfaces to trim the craft. It will be noted that the motors 15 and 16 operate in opposite directions for any given error signal. Thus when the elevator 17 is moved counter-clockwise, the trim tab 18 is moved clockwise, and vice versa.

To provide dead-beat operation of the elevator servomotor 15 and the error signals induced in the take-off device 11, the follow-up signal generator 76 is provided having an energized rotor 82 driven by armature 75 and a stator winding 83. The stator winding is connected by leads 84 across the resistor 23 of the amplifier 21. Operation of the servomotor 15 will cause a signal to be generated by the generator 76 which is impressed across the resistor 23 in opposition to the error signal impressed across the resistor 20. The two signals tend to cancel each other by the operation of the servomotor 15. The motor 15 positioning the elevator 17 in response to the error voltage reduces the error voltage upon response of the aircraft to the change in elevator. The follow-up signal will eventually equal the error signal thereby wiping it out, leaving but the follow-up signal on the grid 24 to reverse the motor 15 to return the elevator to a position in which level flight is maintained.

No follow-back is provided for the trim tab servomotor 16. The operation of the motor 16 is dependent upon the power supplied thereto by the leads 71, 72. When the motor 15 stops, the motor 16 will stop leaving the trim tab 18 in whatever position it happens to be in at the moment transformers 65, 66 are rebalanced and cut off the power in leads 71, 72. The trim tab is thus left in a position in which it continuously acts on the craft to maintain the level flight attitude.

The reverse operation of the trim tab motor 16 with respect to the elevator servo will aid in the positioning of the elevator surface thus reducing the torque required of the motor 15. The large gear reduction of the trim tab servo and the operation thereof on all error signals to move the trim tab 18 at a relatively slow angular rate, serves as an integrator which positions the trim tab for the average load required of the primary surface in maintaining level flight.

It will thus be seen that there is provided an automatic pilot system in which the several objects of this invention are achieved and which is well adapted to meet the conditions of practical use.

As various embodiments may be made of the above invention, and as various changes may be made in the embodiment described, it will be understood that all matter herein set forth, or illustrated in the accompanying drawings, is to be interpreted as illustrative and not in a limiting sense.

Having thus described my invention, I claim as new and desire to secure by Letters Patent:

1. In an automatic pilot system for aircraft having a primary control surface and a secondary control surface movable thereon, the combination comprising a source of error signal voltage responsive to craft deviation from a desired attitude, a balanced voltage device and a second balanced voltage device both adapted to be unbalanced by the error signals of said source, a servomotor connected to one of said devices for positioning the primary control surface, and a second servomotor connected to the other of said devices for positioning the secondary control surface, said servomotors being operable upon unbalance of said devices to position the primary and secondary control surfaces to restore the desired attitude of the craft.

2. In an automatic pilot system for aircraft having a primary control surface and a secondary control surface movable thereon, the combination comprising a source of error signal voltage responsive to craft deviation from a desired attitude, a balanced voltage device and a second balanced voltage device both adapted to be unbalanced by the error signals of said source, a servomotor connected to one of said devices for positioning the primary control surface, a second servomotor connected to the other of said devices for positioning the secondary control surface, said servomotors being operable upon unbalance of said devices, and a follow-up signal generator operable by said first servomotor tending to balance, and unbalance in an opposite direction said voltage devices to position the primary and secondary control surfaces to restore the desired attitude of the craft.

3. In an automatic pilot system for aircraft having a primary control surface and a secondary control surface movable thereon, the combination comprising a source of error signal voltage responsive to craft deviation from a desired attitude, a balanced voltage device and a second balanced voltage device both adapted to be unbalanced by the error signals of said source, a servomotor connected to one of said devices for positioning the primary control surface, a second servomotor connected to the other of said devices and having a high gear ratio for positioning the secondary control surface at a relatively slow angular rate, said servomotors being operable upon an unbalance of said devices, and a follow-up signal generator operable by said first servomotor tending to balance, and unbalance in an opposite direction said voltage devices to position the primary and secondary control surfaces to restore the desired attitude of the craft.

4. In an automatic pilot system for aircraft having a primary control surface and a secondary control surface movable thereon, the combination comprising a source of error signal voltage responsive to craft deviation from a desired attitude, a balanced voltage device and a second balanced voltage device both adapted to be unbalanced by the error signals of said source, a servomotor connected to one of said devices for positioning the primary control surface, a second servomotor connected to the other of said devices and having a high gear ratio for positioning the secondary control surface at a relatively slow angular rate, said servomotors being operable upon an unbalance of said devices, and a follow-up signal generator operable by said first servomotor tending to balance, and unbalance in an opposite direction said inductive device to position the secondary control surface for the average load required of the primary control surface to maintain the desired craft attitude.

5. In an automatic pilot system for aircraft having a primary control surface and a secondary control surface movable thereon, the combination comprising a source of error signal voltage responsive to craft deviation from a desired attitude, a first balanced inductive device and a second balanced inductive device both adapted to be unbalanced by the error signals of said source, a servomotor connected to one of said devices for positioning the primary control surface, and a second servomotor connected to the other of said devices and having a high gear ratio for positioning the secondary control surface at a relatively slow angular rate, said servomotors being operable upon an unbalance of said devices to position the secondary control surface for the average load required of the primary control surface to maintain the desired craft attitude.

6. In an automatic pilot system for aircraft having a primary control surface and a secondary control surface movable thereon, the combination comprising a source of error signal voltage responsive to craft deviation from a desired position, a first balanced voltage device, a second balanced voltage device connected in series with said first balanced voltage device, both of said devices being connected for unbalance by the error signal of said source, a servomotor connected to one of said devices for positioning the primary control surface, a second servomotor connected to the other of said devices for positioning the secondary control surface, said servomotors being operable upon unbalance of said devices to position the primary and secondary control surfaces to restore the desired position of the craft.

7. In an automatic pilot system for aircraft having a primary control surface and a secondary control surface movable thereon, the combination comprising a source of error signal voltage responsive to craft deviation from a desired position, a first balanced voltage device and a second balanced voltage device, both adapted to be unbalanced by the error signal of said source, a servomotor connected to one of said devices for positioning the primary control surface, a second servomotor for positioning the secondary control surface connected to the other of said devices in a manner reversely of the connection of said first servomotor to said one device, said servomotors being operable upon unbalance of said devices to position the primary and secondary control surfaces in opposite directions to restore the desired position of the craft.

8. In an automatic pilot system for aircraft having a primary control surface and a secondary control surface movable thereon, the combination comprising a source of error signal voltage responsive to craft deviation from a desired position, a first normally balanced inductive device and a second normally balanced inductive device both adapted to be unbalanced by the error signal of said source, an actuating device connected to one of said inductive devices for positioning the primary control surface, a second actuating device for positioning the secondary control surface connected to the other of said inductive devices, said actuating devices being operable upon unbalance of said inductive devices to position the primary and secondary control surfaces to restore the desired position of the craft.

9. In an automatic pilot system for aircraft having a primary control surface and a secondary control surface movable thereon, the combination comprising a source of error signal voltage responsive to craft deviation from a desired position, a first balanced voltage device, a second balanced voltage device connected in series with said first balanced voltage device, both of said devices being connected for unbalance by the error signal of said source, motor means connected to both of said devices for positioning the primary and secondary control surfaces, and means operated during positioning of one of said surfaces for developing a signal in opposition to the error signal of said source.

ALAN M. MacCALLUM.

REFERENCES CITED

The following references are of record in the file of this patent:

UNITED STATES PATENTS

| Number | Name | Date |
|---|---|---|
| 2,143,139 | Carlson et al. | Jan. 10, 1939 |
| 2,183,932 | Carlson | Dec. 19, 1939 |
| 2,232,982 | Tank | Feb. 25, 1941 |
| 2,392,381 | Hanson et al. | Jan. 8, 1946 |